Figure 1:
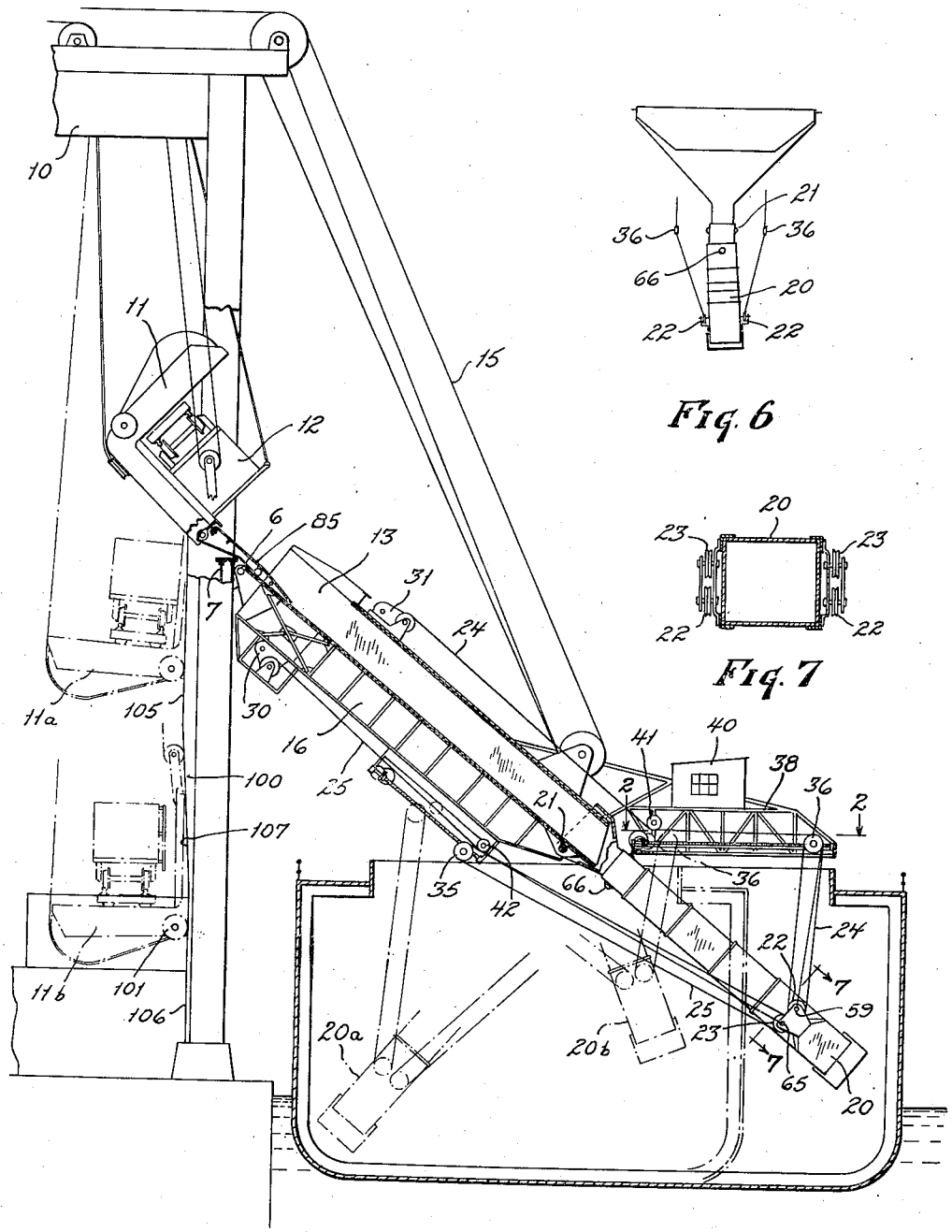

Oct. 8, 1940.    R. W. KALTENBACH    2,216,742
MATERIAL HANDLING DEVICE
Filed May 13, 1938    5 Sheets-Sheet 2

INVENTOR.
ROBERT W. KALTENBACH
BY Bates, Goldrick, & Teare
ATTORNEYS

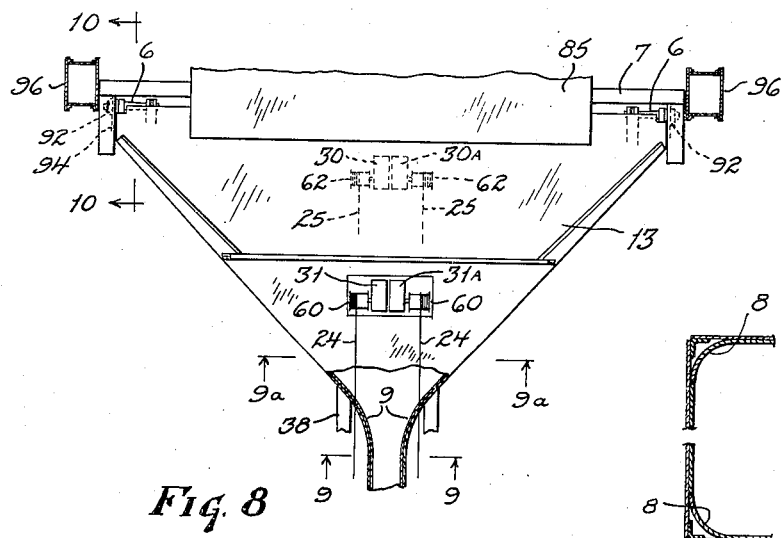
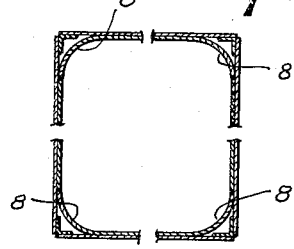
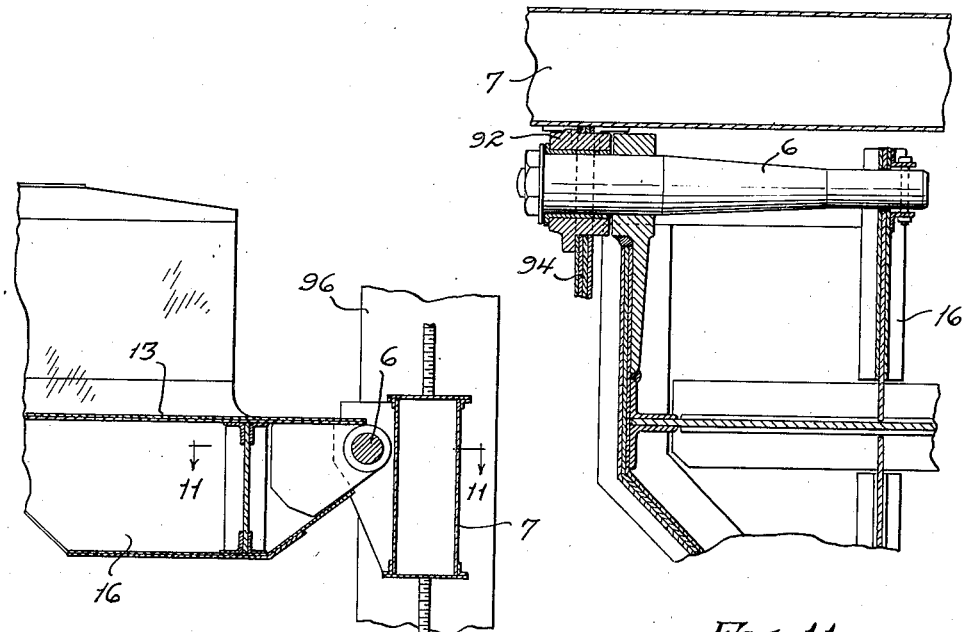

UNITED STATES PATENT OFFICE 2,216,742

MATERIAL HANDLING DEVICE

Robert W. Kaltenbach, Cleveland Heights, Ohio

Application May 13, 1938, Serial No. 207,776

10 Claims. (Cl. 193—3)

This invention relates to material handling devices for transferring material such as coal from railway cars to vessels. One form of device that is suitable for this purpose has included a material receiving member such as a chute or pan, and an extensible vertical spout which is mounted for universal swinging movement adjacent the outer end of the pan. The universal movement of the spout has been obtained through pivotal connections by means of which the spout could be swung inwardly or outwardly with reference to the vessel, for the purpose of directing the material into the hold of the vessel. The inwardly and outwardly swinging movement of the spout has heretofore been accomplished by cables, and the cables have been guided by non-shiftable sheaves which have been mounted upon an outrigger adjacent the lower end of the pan. It has been desirable to support the outrigger sheaves as far as possible from the spout pivot in order to swing the spout a maximum degree inwardly and outwardly, but the location of the sheaves has been limited by the size of the hatches through which the spout is adapted to extend. This limitation has necessitated a location of the oturigger sheaves sufficiently close to the pan so that the cables could clear the hatch combings on the narrowest vessel. The difficulty, however, has been that whenever the sheave arrangement permitted the introduction of the spout into a narrow vessel, it would not permit sufficient outboard movement of the spout on materially wider vessels, with the result that it has been necessary to trim the load by hand, or to use a power-operated trimmer. Trimming by hand or by means of a power-operated throwing device not only increases the cost of loading but also increases the breakage of coal, and necessitates additional handling and therefore movement of some of the lumps with relation to the other, thereby causing degradation.

An object of my invention, therefore, is to make a material handling device which will permit the proper placement of the coal in vessels of varying width with the least amount of breakage and degradation without requiring any further handling for proper distribution within a vessel, such as by hand operation or power-trimmer. In this connection, my invention is intended for use without materially increasing the cost of the device, and my invention is likewise intended for use on existing, as well as on newly constructed devices.

The mechanism heretofore used for operating the spout swinging cables has been mounted on the pan and adjacent the upper surface thereof, but I have found that when the mechanism is so located, the cables, particularly on the inboard side, have had reverse bends in them in order to extend around the guiding sheaves. A reeving arrangement, however, which necessitates the use of reverse bends causes premature failure of the cables, and thereby increases the maintenance cost of the equipment. Accordingly, an additional object of my invention contemplates the disposition of the outboard operating cable mechanism above the pan, and the disposition of the inboard cable operating mechanism beneath the pan, so as to eliminate the need for reverse bends in the cables.

An advantage of mounting the inboard cable operating mechanism beneath the pan is the fact that the inboard guiding sheaves may be mounted for shiftable movement with relation to the pivot of the vertical spout, and that the cable operating mechanism may be located nearer to the pan pivot thereby lessening the load on the pan hoisting cables.

An important consideration in the design of a material handling device is the provision of means for reducing breakage of coal to a minimum as it moves downwardly into the extensible chute. In this connection, the angle at which the pan is disposed has an important bearing on the result produced; that is to say, a steep or sharp angle tends to make the coal flow too rapidly thereby resulting in more degradation than would be the case where a lesser angle or slope is employed. One of the factors which governs the angle of the pan is the restrictive action on the flow of coal, caused by the tapering of the pan at its discharge end. Heretofore, the tapered walls of the pan intersected the walls of the throat at a sharp angle, thus presenting a condition which would tend to make the coal arch and cease to flow into the discharge passageway. To overcome this difficulty, the practice heretofore has been to increase the angle of the pan so as to increase the rate at which the coal flows but as previously pointed out, any increase in the angle of the pan tends to increase degradation of the coal.

A further object of my invention, therefore, is to eliminate the sharp angle between the tapered walls of the pan and the walls of the throat thereby avoiding the condition which tends to make the coal arch at the restricted part of the pan, and thus enabling the pan to be operated at a lesser angle. Obviously, the flatter the angle, the greater the reduction in height to which the cradle must be elevated to empty a car.

Degradation of coal in its movement from a car to a vessel occurs not only in the pan but also at the point where the coal is emptied from the car onto the chute or pan. In other words, degradation occurs whenever a drop occurs in the line of flow. One instance of the occurrence of a drop in prior constructions is between the top edge of the car and the adjacent wall of the cradle and this has been caused by the fact that the car has been supported upon spaced bumper bars or blocks that project outwardly from the wall of the cradle. Bumper bars have been deemed necessary, however, in order to provide adequate space for receiving the ladder handles on the side of the car.

A further object of my invention then is to eliminate the drop between the top of the car and the side wall of the cradle by eliminating the spaced bumper bars and providing instead a construction that will enable the side of the car to rest directly upon the side of the cradle and still provide adequate space for the ladder handles.

The power required to lift and tilt a loaded car reaches a maximum during the tilting operation, the major portion of the power for the tilting operation being required at the start of it.

My invention additionally contemplates, therefore, a construction by means of which considerable resistance to the turning effort is overcome during the lifting motion of the cradle. This advantage results in a saving in power each time that the cradle is operated.

Heretofore the connection between the pan and the supporting girder embodied what might be termed a piano hinge, that is, a hinge embodying registering straps extending along the top end of the pan through which a succession of hinge pins extend. This construction, however, is objectionable because of the forces which tend to buckle or bend the supporting girder and because of the high erection and maintenance costs. One of the important maintenance costs has been that of maintaining proper alignment of the supporting girder.

A further object of my invention, therefore, is to make a trunnion connection between the pan and the supporting girder that will obviate the old type of construction and which therefore, will reduce the erection and maintenance costs. Additionally, my invention includes a hinge construction that will transmit the load stresses more directly to the main columns of the frame and thereby simplify the construction and lower the maintenance cost.

Figure 2:
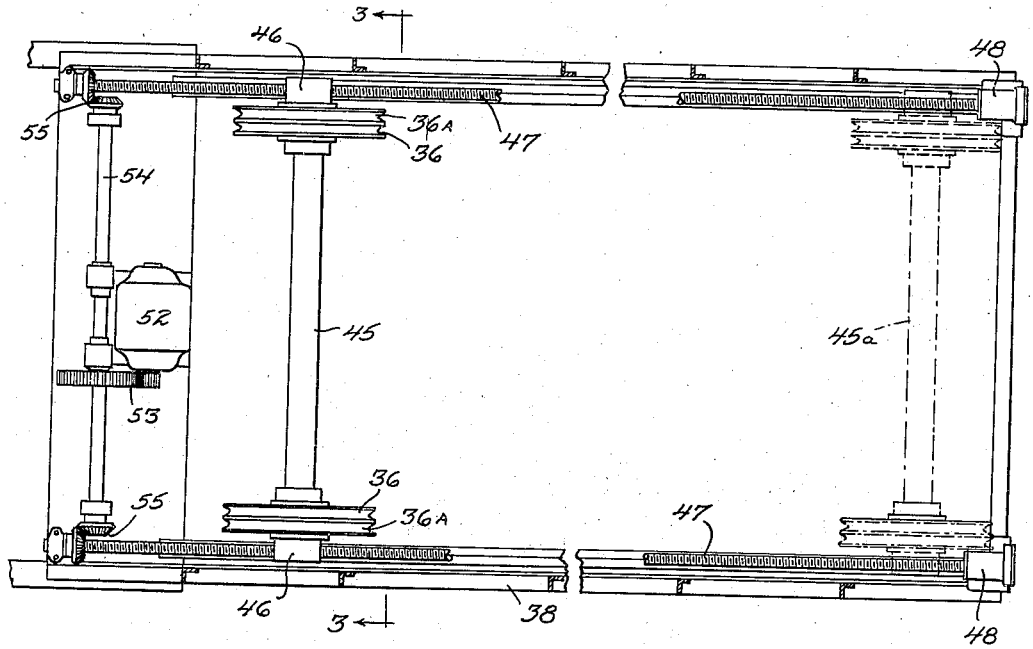
Figure 3:
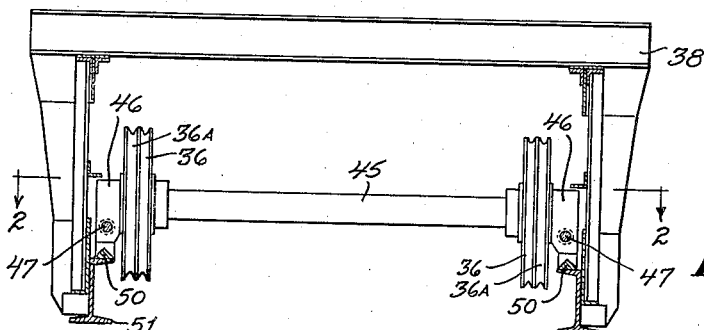
Figure 4:
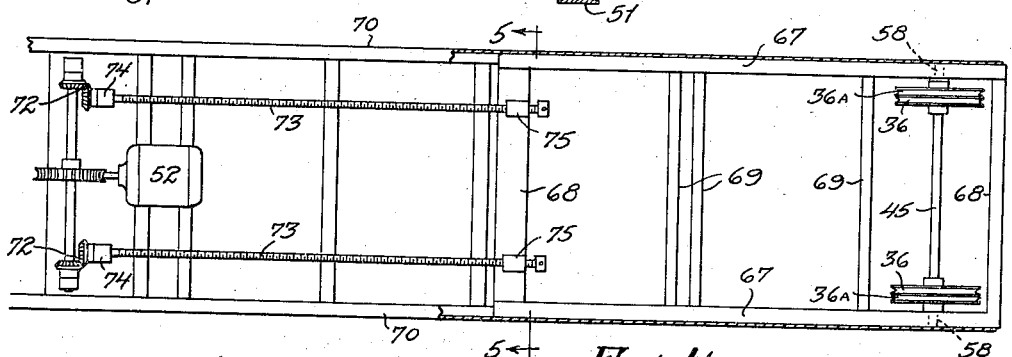
Figure 5:
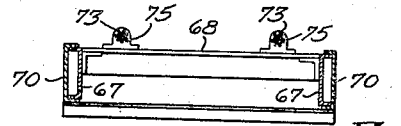
Figure 12:
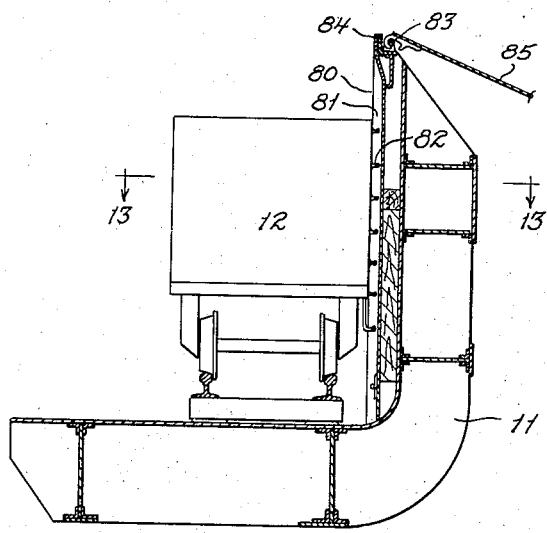
Figure 13:
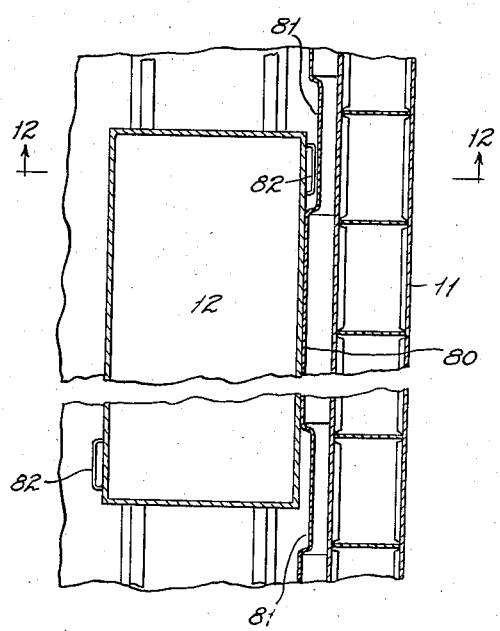
Figure 14:
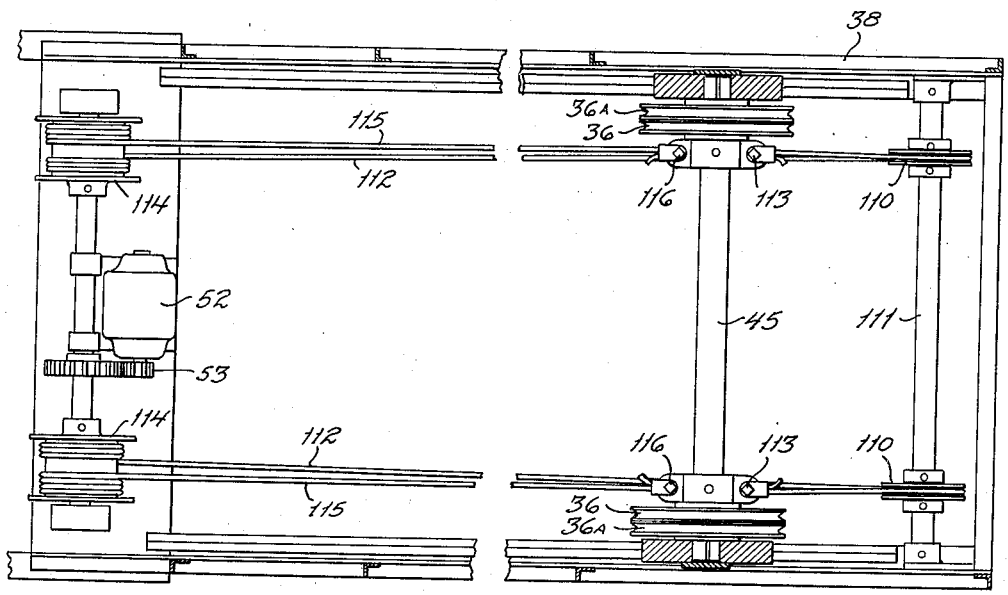
Figure 15:
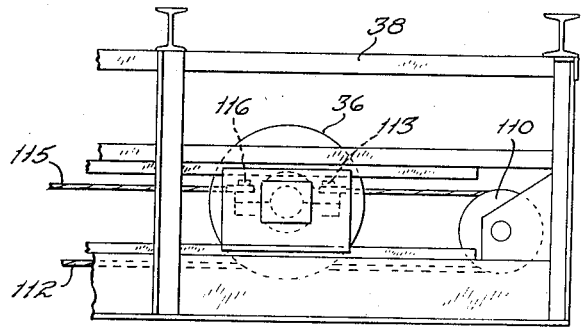

Referring now to the drawings, Fig. 1 is a side elevation of a car dumper embodying my invention; Fig. 2 is a section taken on the line 2—2 in Fig. 1 and illustrating the mechanism on a scale larger than that shown in Fig. 1; Fig. 3 is a section taken on the line 3—3 in Fig. 2; Fig. 4 is a top plan view showing a modified form of mechanism for shifting the outboard cable sheaves; Fig. 5 is a section taken on the line 5—5 in Fig. 4; Fig. 6 is an end view of the car dumper; Fig. 7 is a horizontal section through the discharge chute; Fig. 8 is a top plan view partly in section of part of the car dumper showing the pan construction; Fig. 9 is a vertical section which represents the construction illustrated in sections taken on the lines 9—9 or 9a—9a in Fig. 8; Fig. 10 is a section taken on the line 10—10 in Fig. 8 but on a somewhat larger scale; Fig. 11 is a section taken on the line 11—11 in Fig. 10; Fig. 12 is a vertical section taken through the car supporting cradle; Fig. 13 is a section taken on a plane indicated by the line 13—13 in Fig. 12; Fig. 14 is a top plan view of a cable system for shifting the sheaves, and Fig. 15 is a side elevation of the mechanism shown in Fig. 14.

A material handling device with which I have illustrated my invention embodies a car dumper having a frame 10 in which a car supporting cradle 11 is movably mounted; the cradle being shown in full lines in tilted position with a car 12 mounted thereon and clamped thereto. The content of the car receivable in a pan 13 which may be pivoted to a supporting girder 7 and which is adapted to be swung about the pivot by means of a cable 15. The pan structure includes a framework 16 on which the pan is supported, it being understood that the floor of the pan rests upon the framework and that the framework is pivoted to the girder at 6. The pan is wider at its top than the length of any car that may be received by the cradle, but the sides of the pan converge toward the outer end thereof at which point a telescopic spout 20 is arranged to receive the contents of the pan. To prevent arching of the coal at the throat of the pan, the vertical walls are curved as shown at 9 in Fig. 8, and in the preferred arrangement, the corners are covered by curved lining plates 8 in Fig. 9. This curved construction aids the free movement of coal and thereby enables the pan to be maintained at a flatter angle than would be required where the walls meet at a sharp angle. The spout illustrated is telescopic and is pivotally mounted on the pan framework at 21 and is provided with two sets of sheaves indicated at 22 and 23 for receiving the outboard and inboard cables 24 and 25 respectively. In practice, the top of the pan is enclosed from the bottom nearly to the top, so as to hold a substantial quantity of material whenever the lower end of the spout is closed.

The mechanism for operating the inboard cables is illustrated in general at 30 and 30—A as comprising electric motor driven drums which are mounted on the framework beneath the pan while the motors for operating the outboard cables are indicated at 31 and 31—A as being mounted on a support that extends across the upper side of the pan. The inboard and outboard cable guiding sheaves are indicated at 35 and 36 respectively and are preferably journalled in bearings which may be shifted with respect to the spout pivot. Thus, in the form shown in Fig. 1, the sheaves 36 are supported on an outrigger 38 that is rigidly attached to the pan framework. The outrigger supports the control house 40 in which suitable controls are provided for operating the telescopic spout actuating motors. While I have illustrated electric motors for actuating the drums, I may, if desired, use steam engines or other motive power.

One form of mechanism for shifting the outboard sheaves is shown in greater detail in Figs. 2 and 3 wherein the sheaves 36 and 36—A are journalled on a cross bar 45, the ends of which terminate in blocks 46. Each block has a threaded passageway therethrough for receiving a screw-shaft 47 and each shaft in turn is journalled at its outer end in a thrust bearing 48 which is positioned adjacent the end of the outrigger. The blocks 46 are supported upon guides 50 which extend longitudinally of the beams 51 that form part of the outrigger.

To rotate the shafts 47, I may utilize an electric motor 52 which is suitably connected through reduction gearing 53 to a cross shaft 54, and the cross shaft in turn is suitably connected by bevel gearing 55 to each screw shaft. The motor is reversible and hence, when rotated in either direction, operates the screw shafts to move the sheave bar 45 and the accompanying sheaves 46 inwardly or outwardly with respect to the pan. In Fig. 2, the sheave bar is shown in one position by the solid lines and in another position by the broken lines 45—a. Suitable sheaves 41 journalled on the outrigger guide the cables 24 whenever the sheaves 38 are in an outer position.

While I have described in detail, the mechanism for supporting and moving the outboard sheaves 36 it is to be understood that the same mechanism may be employed for supporting and moving the inboard sheaves 35. This mechanism, however, is preferably positioned on the underside of the pan girders, as is shown in general in Fig. 1. Additionally, suitable sheaves 42 journalled on the pan framework guide the cables 25 whenever the spout 20 is swung outwardly as shown in Fig. 1.

The outboard cables are arranged in dual sets and the reeving of each is substantially as follows: Each cable 24 has one end fixed to a drum 60 from whence it passes down the upper side of the pan beneath a guide sheave 41, the axis of which is non-shiftable, and thence around the shiftable sheave 36, downwardly around sheave 22, thence upwardly around sheave 36—a, and thence downwardly where it is dead-ended as at 59 onto the lower section of the spout.

The inboard cables are also arranged in dual sets and the reeving when the spout is swung outwardly is substantially as follows: Each cable 25 has one end thereof fixed to a drum 62 from when it passes down the underside of the pan between the guide sheave 42, the axis of which is non-shiftable and the shiftable sheave 35, downwardly around sheave 23, thence upwardly around the sheave 35—a, thence downwardly where it is dead-ended, as at 65, to the lower section of the spout. Whenever the spout is swung inwardly and the sheaves 35 are retracted as shown at 20—A in Fig. 1, the cables 25 do not contact the sheaves 42; instead, they pass over the sheaves 35 and then extend directly downwardly.

The shiftability of the inboard and outboard sheaves increases the inboard and outboard swing of the telescopic spout, thus enabling the spout to be swung crosswise of a vessel so as to distribute material across the full width of vessels without positioning the pan or other receiving member at too steep an angle.

To obtain fore and aft swinging of the spout, I space the outboard guide sheaves 36 farther apart than the outboard guide sheaves 22. In like manner, I space the inboard guide sheaves 35 materially farther apart than the inboard guide sheaves 23. In this way, there is sufficiently adequate clearance between the upper and lower sets of sheaves, (as shown in Fig. 6) to swing the spout about the pivot 66 and thereby to obtain a fore and aft movement of it.

In Figs. 4 and 5, I have shown a modification of my invention wherein the moving sheave supporting bar 45 is journalled at 58 upon a carriage that is shiftable toward and from the pan upon operation of the motor 52. In this modification, the carriage is shown as an open frame having side bars 67, end bars 68 and intermediate cross-bars 69. The frame is slidably supported within the stationary part of the support and preferably, within the beams 70 which are shown as channel shaped members upon the flanges of which the carriage is suitably guided. The carriage may be propelled by operation of the motor 52 which is suitably connected through worm reduction gearing 71 and bevel gearing 72 to the screw shafts 73. These shafts are journalled at 74 upon the outrigger and are in threaded engagement with passageways 75 upon the inner end bar 68 on the carriage. In this way, the shafts and bar provide screw and nut couples by means of which the carriage may be shifted upon operation of the motor in either direction. In this modification, the cable reeving for the spout, and the disposition of the mechanism for operating the cables, is substantially the same as that illustrated and described in connection with the disclosure of Fig. 1. It is to be understood that this modified construction may apply either to the outboard or inboard movable sheaves.

A further modification of the mechanism for moving the shiftable sheaves is indicated in Figs. 14 and 15 wherein the cable mechanism is utilized for moving the shiftable sheaves instead of the screw threaded shaft construction that is shown in Figs. 2 and 4. In this modification the framework will be substantially the same as that illustrated in Fig. 2 except for the fact that a pair of sheaves 110 are journalled for movement on a cross-bar 111 for guiding outhaul cables 112, which has one end fixed as at 113 to the cross-member 45, and the other end of which is fixed to the drum 114. Each drum, in turn, is adapted to be operated by a motor 52 through suitable reduction gearing 53. Inhaul cables 115 are likewise attached at one end to the cross-member 45 as at 116 and to the other end to the drums 114. Thus, when the motor is operated in one direction, the cross-member 45 together with the sheaves 36 and 36—a are shifted inwardly and outwardly depending on the direction of motor rotation.

In Figs. 12 and 13, I have shown a cradle construction which minimizes the drop of the flow of coal from the car onto the side wall of the cradle during the tilting operation. In the form illustrated, the body of the car rests directly against the wall 80 of the cradle, and the wall has a well 81 into which the ladder irons 82 are adapted to extend. The car engaging wall extends above the top of the car in a continuous plane and projects, as at 84, above the hinge pin 83 about which the apron is pivoted during the tilting operation. In this way, the top edge of the wall overlaps an apron 85 which bridges the gap between the cradle and the pan. Thus, as shown, in Fig. 1, when the cradle is in the tilted position, there is a smooth surface along which the coal may flow from the car into the pan. This construction therefore allows the car to be clamped to the cradle in the usual way, and minimizes any objectionable drop of the coal during its passage into the pan.

To support the pan for a hinging movement upon the frame and at the same time eliminate the piano hinge type of construction heretofore employed, I use two hinge pins 6 that are positioned at opposite ends of the pan adjacent the inlet end thereof and each of which is journalled in a bearing 92 which is carried in a bracket 94 on the girder 7 and adjacent the column 96. In this way, the load stresses are transmitted more directly to the main columns of the frame and hence, the girder is relieved of practically all of the horizontal force tending to bend it. Additionally, by utilizing the trunnion mounting, I have greatly reduced the cost of erection and the cost of maintenance.

To reduce the power required for tilting the cradle, I provide a track construction which causes a partial tilting of the cradle during the lifting operation, that is, before the cradle reaches the pivot about which the turning movement is accomplished. The preferred construction for carrying out this feature of my invention embodies an inclined trackway 100 (Fig. 1) which extends upwardly along the columns of the frame 10. This trackway is adapted to be engaged by the rollers 101 that are journalled on the cradle. The cradle is illustrated in three positions in Fig. 1; the full line showing the tilting operation, the broken line 11—a showing the intermediate position and the broken line 11—b indicating the lowermost position. The intermediate position 11—a shows a slightly tilted cradle, this being occasioned by the fact that the upper part of the trackway 100 is in a different vertical plane from the lower part. As shown, the trackway has an upper reach 105 and a lower reach 106 which are in substantial parallel planes and which are connected by an inclined portion 107. The net result of this construction is a material saving in power that is required for turning the cradle at the top of the lifting operation.

From the foregoing description, it will be apparent that I have provided a simple and effective mechanism for distributing the coal with a minimum amount of degradation into vessels of different size without necessitating the use of hand labor or power devices for trimming the load. Additional, I have provided a pan or chute construction which maintains a continuous flow of coal at a reduced angle of the pan, and I have lessened the drop of coal and therefore minimized the breakage between the car and the cradle wall. Moreover, I have considerably lessened the bending stresses that are exerted upon the pan supporting girder of the frame by employing a hinge construction which transmits the load stresses more directly to the columns of the frame.

I claim:

1. A material handling device comprising in combination, a member for receiving the contents of a car, a spout pivoted for swinging movement with reference to the member, mechanism for swinging the spout, said mechanism including cables and guide sheaves positioned on opposite sides of the spout pivot, and means for shifting some of the sheaves toward and away from the pivot for varying the angle of pull on the spout.

2. A material handling device comprising in combination a material receiving member, a spout mounted for swinging movement adjacent the end of the member and having a connection therewith for receiving the contents thereof, four cables operatively connected to the spout, means for operating the cables, an outrigger, guide sheaves for some of the cables supported by the outrigger, and means operable independently of the cables for shifting said guide sheaves with reference to the connection between the member, for varying the angle of pull on the spout.

3. In a car dumper, the combination of a frame, a material receiving member pivoted thereto, a telescopic spout pivoted at its upper end for swinging movement with reference to the member, cables operatively connected to the spout, means carried by the member for actuating the cables, a supporting structure for the member, guide sheaves for the cables supported by said structure, and means for shifting the guide sheaves along the structure with relation to the pivotal connection between the member and spout for varying the angle of pull on the spout.

4. In a car dumper, the combination of a frame, a material receiving member pivotally supported thereon, a telescopic spout pivoted to the member adjacent the outer end thereof, cables connected to the spout for swinging it with reference to the member, power means carried by the member and disposed on the upper side thereof for operating some of the cables, and other power means carried by the member and disposed on the lower side thereof for operating others of said cables.

5. In a car dumper, the combination of a frame, a material receiving member extending downwardly therefrom, a telescopic spout pivotally connected to the member, two sets of cables operatively connected to the spout for swinging it in all directions with reference to the member, mechanism mounted above the member for operating one set of cables, and mechanism mounted below the member for operating the other set of cables, each mechanism including means for varying the angle of pull on the spout in either an outward or inward direction.

6. In a car dumper the combination of a material receiving member, a telescopic spout pivotally supported on the member, two sets of cables for swinging the spout, mechanism for actuating each set of cables, sets of sheaves disposed on opposite sides of the spout for guiding the cables, and means for shifting each set of sheaves with reference to the pivotal connection between the member and spout and with reference to the other set of sheaves.

7. In a material handling device, the combination of a material receiving member, a telescopic spout pivotally connected to the member, cables for swinging the spout, mechanism for operating the cables, sheaves for guiding the cables, a screw and nut couple for shifting the guide sheaves with reference to the pivotal connection between the member and spout and an electric motor for actuating the couple.

8. In a material handling device, the combination of a material receiving member, a spout pivoted to the member, a supporting structure for the member, a carriage movable along the structure, guide sheaves supported by the carriage, cables extending over the guide sheaves and operatively connected to the spout, means for operating the cables and other means for shifting the carriage with respect to the pivotal connection between the member and spout.

9. A material handling device comprising in combination a material receiving member, a spout mounted for swinging movement at the lower end of the member, mechanism for swinging the spout, said mechanism including cables and guide sheaves therefor, relatively shiftable inboard guide sheaves, relatively shiftable outboard guide sheaves, and means including an electric motor, a drum and a cable for shifting the outboard sheaves toward and away from the member and with relation to the inboard guide sheaves.

10. In a car dumper, the combination of a frame, a pan supported thereby, a spout pivoted to the pan and having a connection therewith for receiving the contents of the pan, a supporting structure for the pan, drums mounted on said structure, cables attached to the drums and operable for swinging the spout with reference to the pan, a sheave over which each cable passes, said sheaves being shiftable for varying the angle at which the spout may be swung, and means for varying the position of the sheaves with reference to the pan pivot, some of said sheaves being disposed on the underside of the pan, and some of said sheaves being disposed beyond the outer end of the pan.

ROBERT W. KALTENBACH.